H. P. NOBLE.
SIGNALING DEVICE FOR AUTOMOBILES.
APPLICATION FILED APR. 30, 1915.
1,216,481.
Patented Feb. 20, 1917.
3 SHEETS—SHEET 2.
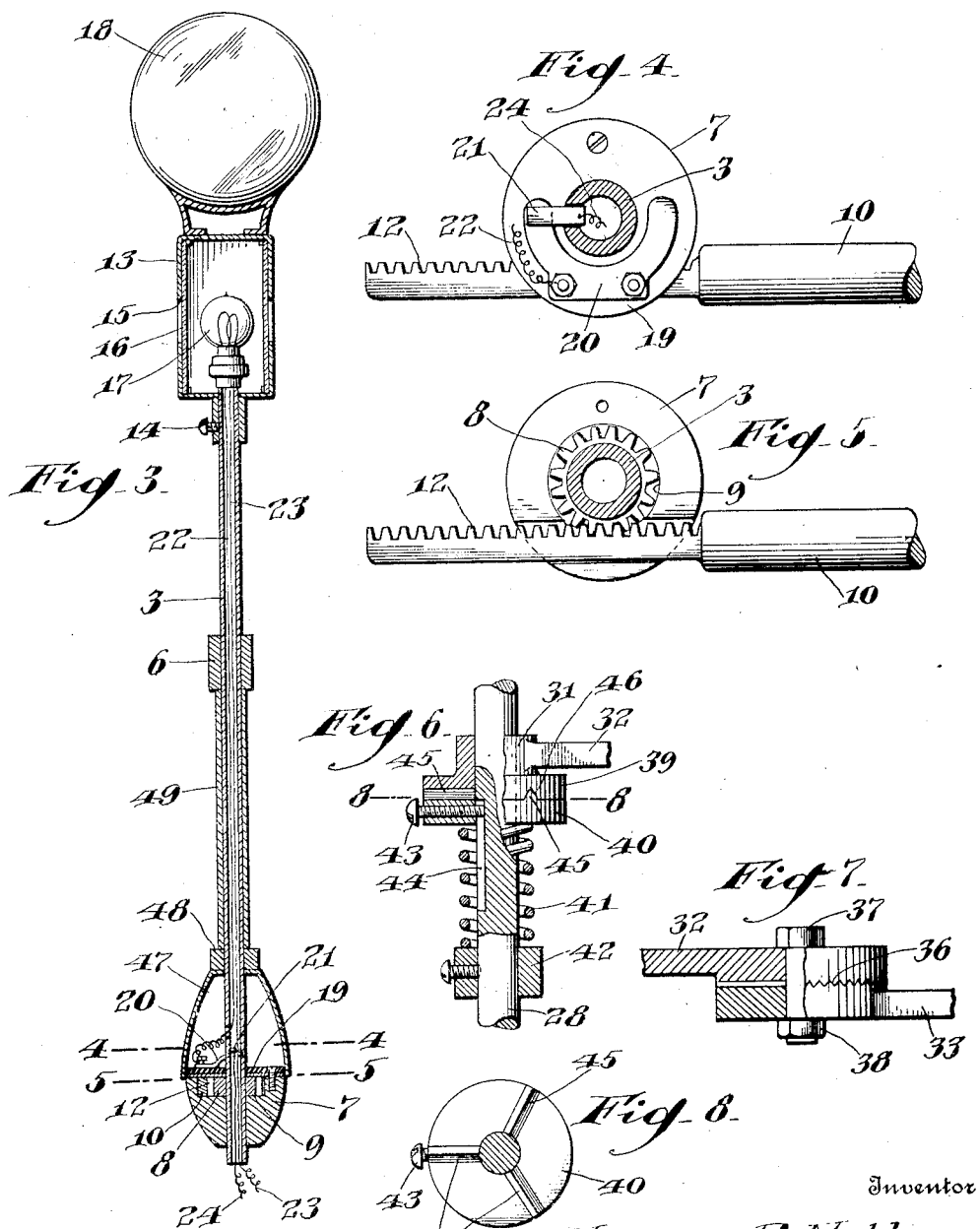
Witnesses
Thos. Riemann
C. R. Ziegler.
Inventor
Harvey P. Noble,
By Joshua R. H. Potts
Attorney H. P. NOBLE.
SIGNALING DEVICE FOR AUTOMOBILES.
APPLICATION FILED APR. 30, 1915.
1,216,481.
Patented Feb. 20, 1917.
3 SHEETS—SHEET 3.
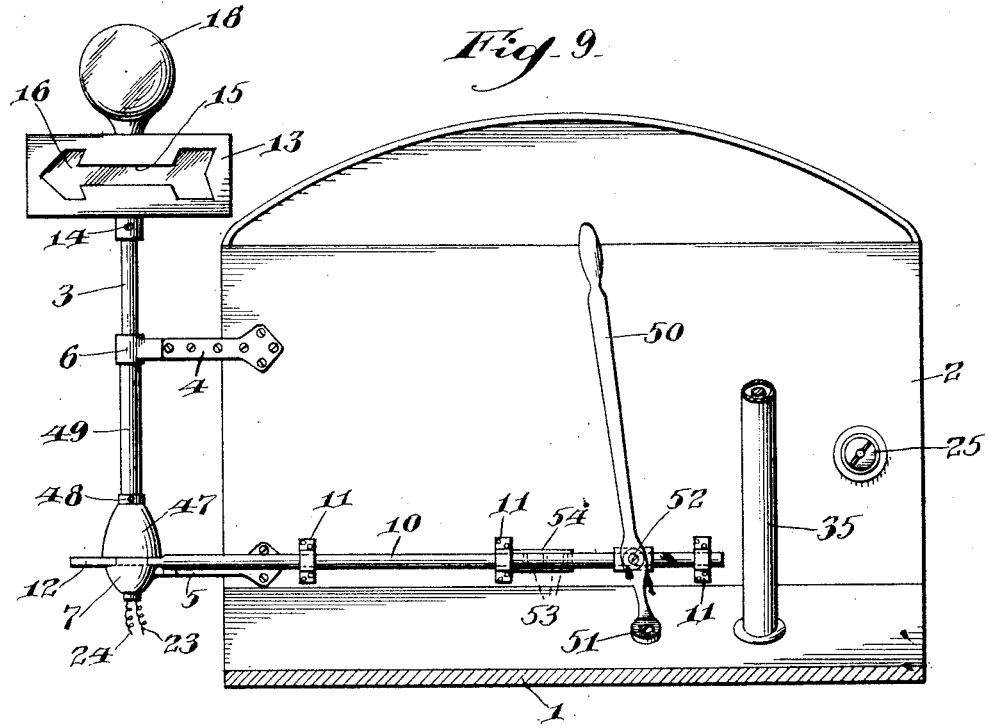
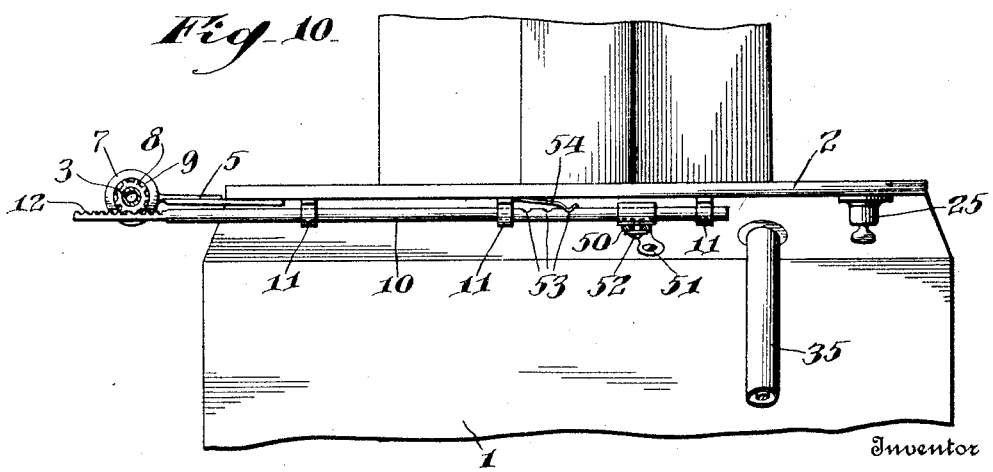
Witnesses
Inventor
Harvey P. Noble,
By Joshua R. H. Potts.
Attorney

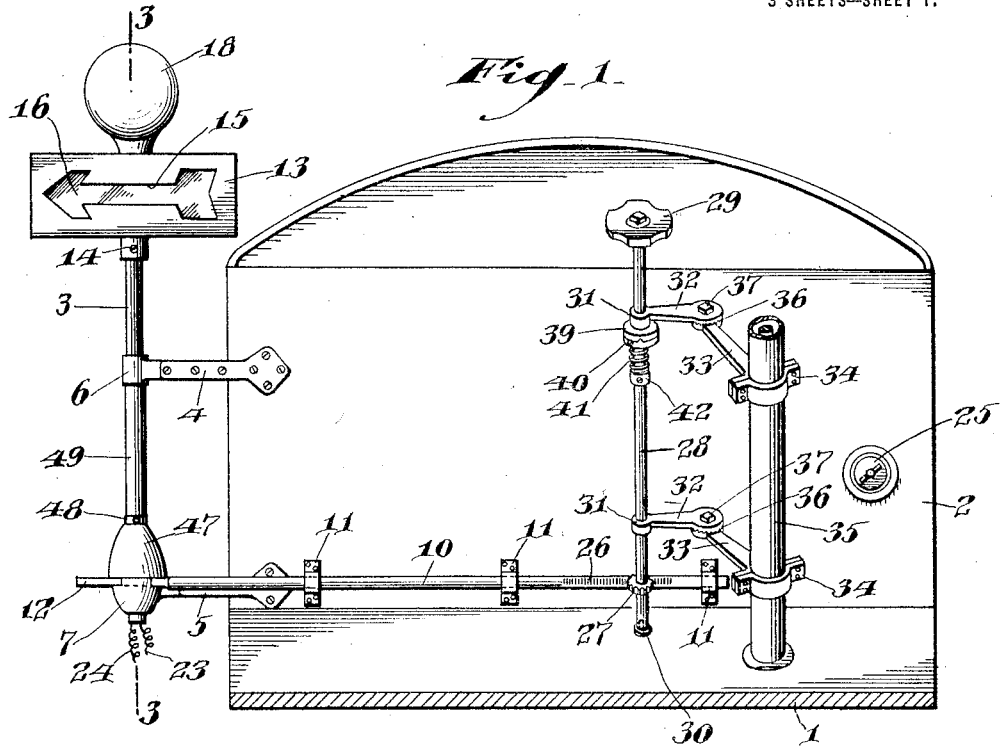
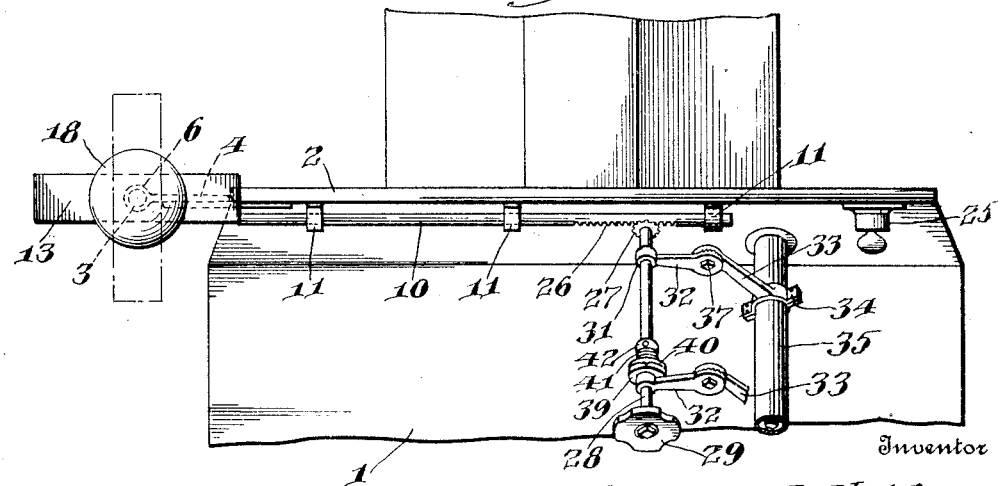

UNITED STATES PATENT OFFICE.

HARVEY P. NOBLE, OF PHILADELPHIA, PENNSYLVANIA.

SIGNALING DEVICE FOR AUTOMOBILES.

1,216,481.      Specification of Letters Patent.      Patented Feb. 20, 1917.

Application filed April 30, 1915. Serial No. 24,869.

*To all whom it may concern:*

Be it known that I, HARVEY P. NOBLE, a citizen of the United States, residing at Philadelphia, in the county of Philadelphia and State of Pennsylvania, have invented certain new and useful Improvements in Signaling Devices for Automobiles, of which the following is a specification.

My invention relates to improvements in signaling devices for automobiles, the object of the invention being to provide an improved construction of signal which may be observed from the front or the rear, and which will indicate the turning direction the driver proposes to take.

A further object is to provide improved means for turning the signal, and improved supporting means for the signal turning means, which permits the mechanism to be readily used in connection with any ordinary type of car.

A further object is to provide improved means for holding the signal in its various positions.

A further object is to provide a signal with an improved mirror which enables the driver to see objects reflected therein from any direction.

A further object is to provide a signal of the character described in which at night the lamp is illuminated when in signaling position, and extinguished when in normal or non-signaling position, thereby preventing any waste of electric current.

A further object is to provide an improved signaling mechanism of the character stated which is adapted for use in connection with heavy trucks as well as passenger cars, and which, with but slight modification, may be utilized in connection with any style of automobile or other vehicle.

With these and other objects in view, the invention consists in certain novel features of construction and combinations and arrangements of parts as will be more fully hereinafter described and pointed out in the claims.

In the accompanying drawings:

Figure 1 is a view in section through the front portion of an automobile illustrating my improvements attached thereto.

Fig. 2 is a fragmentary plan view.

Fig. 3 is a view in longitudinal section on an enlarged scale on the line 3—3 of Fig. 1.

Fig. 4 is a fragmentary view in section on an enlarged scale on the line 4—4 of Fig. 3, the cup 47 being removed.

Fig. 5 is a similar view in section on the line 5—5 of Fig. 3.

Fig. 6 is a fragmentary view partly in elevation and partly in longitudinal section illustrating the means for holding the signal at its various positions of adjustment.

Fig. 7 is a fragmentary view partly in section and partly in elevation showing the connection between the arms 32 and 33.

Fig. 8 is a face view of the disk 40 showing the rod 28 therein in section.

Fig. 9 is a view similar to Fig. 1 illustrating a modification, and

Fig. 10 is a view similar to Fig. 2 of the modification shown in Fig. 9.

1 represents a platform constituting the bottom of an automobile, and 2 is a dash board which is shown flat, but which may be of any ordinary shape, and while my improved attachment is illustrated in connection with a flat dash board, it is to be understood that with but slight modification my improved signaling mechanism may be used on any form of dash board.

At one side of the dash board 2, I locate a vertical tubular shaft 3 supported by bracket arms 4 and 5, which may be sectional and adjustable as illustrated, or may be of any shape and design desired.

The bracket arm 4 has a bearing sleeve 6 at its outer end in which shaft 3 turns. The arm 5 is provided at its outer end with a bearing block 7, through which the shaft 3 projects and freely turns.

A pinion 8 is secured to the shaft 3, and turns in a recess 9 in the upper face of block 7. A horizontal bar 10 is mounted to slide in bearings 11 secured to dash board 2, and one end of this bar 10 is provided with a rack 12 which extends through the recess 9 of block 7, and meshes with a pinion 8, so that the longitudinal movement of rod 10 imparts a rotary movement to shaft 3.

A signal 13 is secured on the upper end of the shaft 3 by means of a set screw 14, and this signal consists of a casing having apertures 15 therein with sheets of glass 16 back of the same. In the present instance the apertures are in the form of an arrow, but may be of any other shape to indicate direction.

The signal is in the form of an oblong box or casing, and inside of the same an electric lamp 17 is located. On top of the signal 13, I locate a spherical mirror 18 which may be secured to the signal in any approved manner, and is located centrally in line with the shaft 3, so that the turning movement of the signal does not effect the position of the spherical mirror. This mirror enables the driver of the car to observe objects from any direction, and is always in the proper position for observations.

A disk 19 of non-conducting material is secured on top of the block 7, and is provided with a horse shoe contact 20. 21 is a pin carried by the shaft 3 and insulated from the latter, and this pin constitutes a movable contact.

Contact 20 is connected by a wire 22 with one pole of the lamp 17, and wire 23 is connected to the other pole of the lamp, and extends to a source of electricity. A wire 24 connects the source of electricity with the pin 21, so that when the pin 21 is in either extreme position, which will be the signaling positions, it will close the electric circuit. The signaling position is indicated in full lines in Fig. 2, and the normal or non-signaling position in dotted lines.

By reason of this arrangement of electric contact no current is wasted, and on the dash board 2 I have shown an ordinary switch 25 which is designed to open and close the electric circuit as desired.

The horizontal bar 10 is provided with a rack 26 which is engaged by a pinion 27 on a rod 28, the latter having a hand wheel 29 at its upper free end to turn the same. The lower end of the rod 28 has a thrust bearing 30, and said rod is supported between its ends in bearings 31.

The bearings 31 form integral portions of arms 32, the latter adjustably connected to arms 33 having clamps 34 located around the steering post 35. The arms 32 and 33 at their meetings ends are formed with serrated enlargements 36, so that when they are clamped together by bolts 37 and nuts 38, they are secured against pivotal movement, but are capable of a wide range of adjustment to properly locate the bearings 31 in accordance with the various locations of steering posts on the many types of vehicles.

The upper bearing 31 is provided with an integral disk 39 which is engaged by a disk 40 movable on rod 28, and pressed into engagement with a disk 39 by a coiled spring 41 located between a collar 42 and the disk 40.

The disk 40 is provided with a key 43 movable in a key way 44 in rod 28 to prevent independent turning movement of the disk, and as the disks 40 and 41 are provided with interengaging ribs 45 and grooves 46, they will operate to hold the rod 28 against accidental turning movement.

While I am not limited to any particular number of such ribs, I have shown in Fig. 8 the disk 40 with three of such ribs which will be a sufficient number to compensate for the various adjustments.

On the shaft 3, I provide a cup 47 which incloses the electric contacts 20 and 21, and this cup is held in place by a collar 48 having a spacing sleeve 49 located above the same around the shaft 3 and below the bracket arm 4.

In Figs. 9 and 10 I illustrate a modification in which the bar 10 is operated by an upwardly projecting hand lever 50 pivotally supported at its lower end as shown at 51, and operatively connected near its lower end to the bar 10 as shown at 52.

In this form of my invention the bar 10 is provided with a plurality of notches 53 in which a spring 54 engages to hold the bar in the several positions of adjustment.

Various slight changes might be made in the general form and arrangement of parts described without departing from my invention, and hence I do not limit myself to the precise details set forth, but consider myself at liberty to make such changes and alterations as fairly fall within the spirit and scope of the appended claims.

Having thus described my invention, what I claim as new and desire to secure by Letters Patent is:

1. The combination with a vehicle, of a signal, a shaft supporting said signal, a rotatable rod, means operatively connecting said rod and shaft, a bearing for said rod including a member surrounding said rod, a second member slidably keyed to said rod, said members having interengaging ribs and grooves, a collar on said rod, an expansion spring on the rod bearing between the collar and said latter member, and means for turning said rod, substantially as described.

2. The combination with a vehicle, of a signal, a shaft supporting said signal, a rotatable rod, means operatively connecting said rod and shaft, a supporting post, adjustable arms secured to said post, one of said arms forming a bearing for said rod and including a disk, a second disk slidably keyed to said rod, said disks having interengaging ribs and grooves, a member secured to said rod, an expansion spring bearing between said member and the latter-mentioned disk, and means for turning said rod, substantially as described.

3. The combination with a vehicle, of a signal, a shaft supporting said signal, a rotatable rod, means operatively connecting said rod and shaft, a supporting post, adjustable arms secured to said post, one of said arms forming a bearing for said rod and including a disk, a second disk on said rod and including a screw, said rod having a keyway therein, said screw acting as a key and having its inner end projecting into said keyway, said disks having interengaging ribs and grooves, a collar on said rod, an expansion spring on the rod bearing between the collar and said latter disk, and means for turning said rod, substantially as described.

4. The combination with a vehicle, of a supporting block having a recess therein, a vertical shaft supported in the block and having a signal thereon, a pinion on the shaft located in the recess, a cup forming a casing on the shaft and covering the pinion, a horizontal rack bar projecting through the recess in the block and meshing with the pinion, a steering post, arms clamped to the steering post, other arms adjustably and pivotally secured to the first-mentioned arms and having bearings at their free ends, a rod in said bearings, a pinion on the rod meshing with the rack bar, and a hand wheel on the rod, substantially as described.

5. The combination with a vehicle, of supports thereon projecting at one side of the vehicle, a vertical shaft mounted in the supports, a signal on the upper end of the shaft, a pinion on the shaft, a bar movable at right angles to the shaft and having a rack thereon engaging the pinion, a second rack on the bar, a rod located at an angle to the bar and having a pinion thereon engaging the rack, a steering post, arms clamped to the steering post, bearings supporting rod, arms on the bearings pivotally and adjustably secured to the first-mentioned arms, a hand wheel on the end of the rod, a disk secured to one of said bearings, a second disk movable on one of the rods, said disks having web and recess engaging faces, and a spring holding the disks together, substantially as described.

6. The combination with a vehicle, of supports thereon projecting at one side of the vehicle, a vertical shaft mounted in the supports, a signal on the upper end of the shaft, a pinion on the shaft, a bar movable at right angles to the shaft and having a rack thereon engaging the pinion, a second rack on the bar, a rod located at an angle to the bar and having a pinion thereon engaging the rack, a steering post, arms clamped to the steering post, bearings supporting the rod, arms on the bearings pivotally and adjustably secured to the first-mentioned arms, a hand wheel on the end of the rod, a disk secured to one of said bearings, a second disk movable on one of the rods, said disks having web and recess engaging faces, a collar on the rod, and a coiled spring on the rod between the collar and the disks holding the disks together, substantially as described.

7. The combination with a vehicle, of a supporting block, an upright shaft extending from said block and having a signal thereon, a cup on said block enveloping a portion of said shaft, a member forming a bottom for said cup, an electric lamp adjacent said signal, an electric contact member secured to the bottom and within the cup, an electrically connected pin extending outwardly from said shaft, and means for relatively moving said shaft to move the pin into engagement with said contact to light the lamp and to change the signal, substantially as described.

8. The combination with a vehicle, of a supporting block, an upright shaft extending from said block and having a signal thereon, a cup on said block enveloping a portion of said shaft, an electric lamp adjacent said signal, a segmental electric contact within the cup and having two contacting portions extending in opposite directions circumferentially of the shaft, an electrically connected pin movable by said shaft, and means for relatively turning said shaft with respect to the contact to alternately move said pin into engagement with the contacting portions to light the lamp when the signal is turned into either of two directions, substantially as described.

9. The combination with a vehicle, of a supporting block having a recess therein, an upright shaft supported in the block and having a signal thereon, a pinion on the shaft and rotatable within said recess, a cup forming a casing on the shaft and having a bottom covering the pinion and the recessed portion of the block, an electric lamp adjacent said signal, an electric contact within the cup and having two contacting portions extending in opposite directions circumferentially of the shaft, an electrically connected member on said shaft, a rack bar slidable within the recess in the block and meshing with the pinion, and means for moving the rack bar longitudinally to move said member alternately into engagement with said contact portions to light the lamp and to change the position of said signal, substantially as described.

In testimony whereof I have signed my name to this specification in the presence of two subscribing witnesses.

HARVEY P. NOBLE.

Witnesses:
 HARVEY F. NOBLE,
 T. H. DIVINE.